United States Patent [19]

Fling

[11] Patent Number: 4,621,290
[45] Date of Patent: Nov. 4, 1986

[54] PIECEWISE LINEAR DIGITAL SIGNAL PROCESSOR AS FOR DIGITAL VIDEO VERTICAL DETAIL PROCESSING

[75] Inventor: Russell T. Fling, Fishers, Ind.

[73] Assignee: RCA Corporation, Princeton, N.J.

[21] Appl. No.: 599,536

[22] Filed: Apr. 12, 1984

[51] Int. Cl.$^4$ .............................................. H04N 5/14
[52] U.S. Cl. .................................... 358/166; 358/37; 358/40; 358/31
[58] Field of Search .................. 358/166, 167, 31, 32, 358/36, 164, 37, 39, 40; 375/19; 307/262, 362

[56] References Cited

U.S. PATENT DOCUMENTS

| | | | |
|---|---|---|---|
| 4,245,237 | 1/1981 | Lagoni | 358/31 |
| 4,316,215 | 2/1982 | Yasumoto et al. | 358/166 X |
| 4,386,434 | 5/1983 | Gibson et al. | 455/37 |
| 4,422,094 | 12/1983 | Lewis, Jr. et al. | 358/37 |

OTHER PUBLICATIONS

Pritchard, D. H., "A CCD Comb Filter for Color TV Receiver Picture Enhancement", RCA Review, vol. 41, Mar. 1980, pp. 3-28.

Primary Examiner—James J. Groody
Assistant Examiner—E. Anne Toth
Attorney, Agent, or Firm—E. M. Whitacre; P. J. Rasmussen; E. P. Herrmann

[57] ABSTRACT

In processing comb filtered video signals it is desirable to separate lower frequency vertical detail signal from comb filtered chrominance and recombine it with the comb filtered luminance signal. System response is enhanced if the vertical detail is non-linear processed before it is recombined with luminance. To core, peak and pare digital vertical detail signal, the signal is passed through an absolute value circuit and then applied to a first signal combiner wherein a first reference value is subtracted from the magnitudes of the input signals. The differences are applied to a polarity discriminator which passes difference values of only one polarity. The one polarity differences are scaled and applied to one input port of a signal combining circuit. The one polarity differences are also applied to a third signal combining circuit wherein a second reference value is subtracted from the one polarity differences to produce a double difference value. The double difference value is applied to a second polarity discriminator which couples one polarity double difference values to a second input port of the second signal combining circuit, the output of which exhibits a piecewise linear, non-linear transfer characteristic.

18 Claims, 3 Drawing Figures

PIECEWISE LINEAR DIGITAL SIGNAL PROCESSOR AS FOR DIGITAL VIDEO VERTICAL DETAIL PROCESSING

This invention relates to apparatus having a piecewise linear transfer characteristic and, in particular, to the use of such apparatus for peaking the vertical detail signal in a digital TV receiver.

In video signal processing appratus, e.g. a television receiver, it is conventional to separate the luminance and chrominance signal components of the video signal to permit separate processing of the two components. This may be accomplished by simply filtering the video signal to split it into bands of high frequency components (for chrominanc) and low frequency components (for luminance), but a preferred technique is to take advantage of the interleaved nature of the luminance and chrominance components by separating the signals in a comb filter. In the comb filter, two or more successive lines of video information are additively and subtractively combined to produce separated luminance and chrominance signals at outputs exhibiting complementary comb-like response characteristics. When the video signal is comb filtered over the full video frequency band, however, both chrominance and luminance information will be provided in the signal at the output nominally termed the chrominance output. In the NTSC television system, the chrominance information will occupy the frequency band above about 2.0 MHz in this output signal, and luminance information, termed vertical detail information, will be located below approximately 1.0 MHz, the exact upper frequency limit of the vertical detail information being a function of scene content.

When the video information is to be processed digitally, the digitally encoded chrominance and vertical detail information signals may be separated by finite impulse response low pass and bandpass filters. The chrominance information may then be demodulated and processed in a digital chrominance signal processor, and the vertical detail information is combined with the comb filtered luminance signal developed at the luminance output of the comb filter to produce a fully restored luminance signal.

In addition to restoring the vertical detail information in the luminance signal, it has been found to be desirable to add an extra amount of vertical detail information to the luminance signal as a peaking signal, which favorably produces a sharper, crisper, reproduced image. Experiments have shown that it is also desirable to process the peaking signal, prior to combining it with the restored luminance signal, in a circuit which exhibits a particular non-linear signal amplitude transfer function characteristic. Such a non-linear processing circuit for analog signals is described and shown in U.S. Pat. No. 4,245,237. This processing circuit subjects vertical detail signals of different amplitudes to different amounts of signal gain. Specifically, small amplitude signals are translated with a prescribed low gain, referred to as coring, to attentuate low amplitude noise. Moderate amplitude signals are subjected to enhancement (peaking) and large amplitude signals are subjected to amplitude reduction (paring).

Digital circuitry for processing digitized video signal in a similar manner is described in U.S. Pat. No. 4,422,094. The apparatus of this invention includes a digital memory programmed with data words representative of the desired transfer function. Digital vertical detail signals which are to be processed are applied as address input codes to the memory. Responsive to the address input codes the memory produces output signal corresponding to the input signal transformed by the desired transfer characteristic. The input signal and the output signal from the memory are combined and then combined with the comb filtered luminance signal. Implementing the transfer function with memory has the drawback that the function cannot be conveniently altered as a function of signal characteristics. To change the transfer function in general requires reprogramming the memory. To accomplish reprogramming necessitates extra buffer memory and typically is a relatively slow process requiring several frame intervals.

It is an object of the present invention to provide a non memory based digital signal processing system for processing, e.g. vertical detail signal with a piecewise linear transfer function. It is also an object to provide a system which is capable of being reprogrammed substantially instantaneously and without requiring additional hardware.

SUMMARY OF THE INVENTION

The present invention is apparatus providing a symmetrical, piecewise linear, non-linear transfer function. Signals to be processed are applied to an absolute value circuit which outputs an unsigned magnitude value and a signal indicative of the sample polarity. The magnitude values are applied to the cascade connection of a first, second and third signal combining circuits (SCC) and first, second and third signal polarity discriminators (as used herein a polarity discriminator is circuitry which passes signal of only one polarity). The second SCC is coupled to the output of the first SCC by the first polarity discriminator and the third SCC is coupled to the output of the second SCC by the serial combination of the second polarity discriminator and a first signal scaling means. The third SCC is also coupled to the output of the first SCC by the serial combination of the first polarity discriminator and a second signal scaling circuit. Finally, the output of the third SCC is coupled to a signal complementing circuit via the third polarity discriminator circuit. The signal complementing circuit is controlled by the polarity signal from the absolute value circuit.

The first SCC subtracts a first reference value from the magnitude values. Single polarity differences passed by the first discriminator correspond to a cored signal. A second reference value is subtracted from the single polarity differences by the second SCC and scaled by the first scaling circuit. The single polarity differences from the first discriminator are also scaled by the second scaling circuit. The third SCC subtracts the scaled sample differences from the first scaling circuit from the scaled sample differences from the second scaling circuit. A single polarity signal from the third SCC is coupled to the signal complementing circuit by the third polarity discriminator.

For a sample value $X_n$ the circuit output $Y_n$ can be expressed $$Y_n = (K_2(X_n - X_{R1})_p - K_1((X_n - X_{R1})_p - X_{R2})_p)_p$$

where the respective parentheses subscripted with a p are meant to indicate that the values of the function within the parenthesis are respectively of one polarity only, $K_1$ and $K_2$ are the first and second scale factors and $X_{R1}$ and $X_{R2}$ are the first and second reference values.

The function is made programmable by provision for changing either scale factors or the reference values.

DETAILED DESCRIPTION

Figure 1:
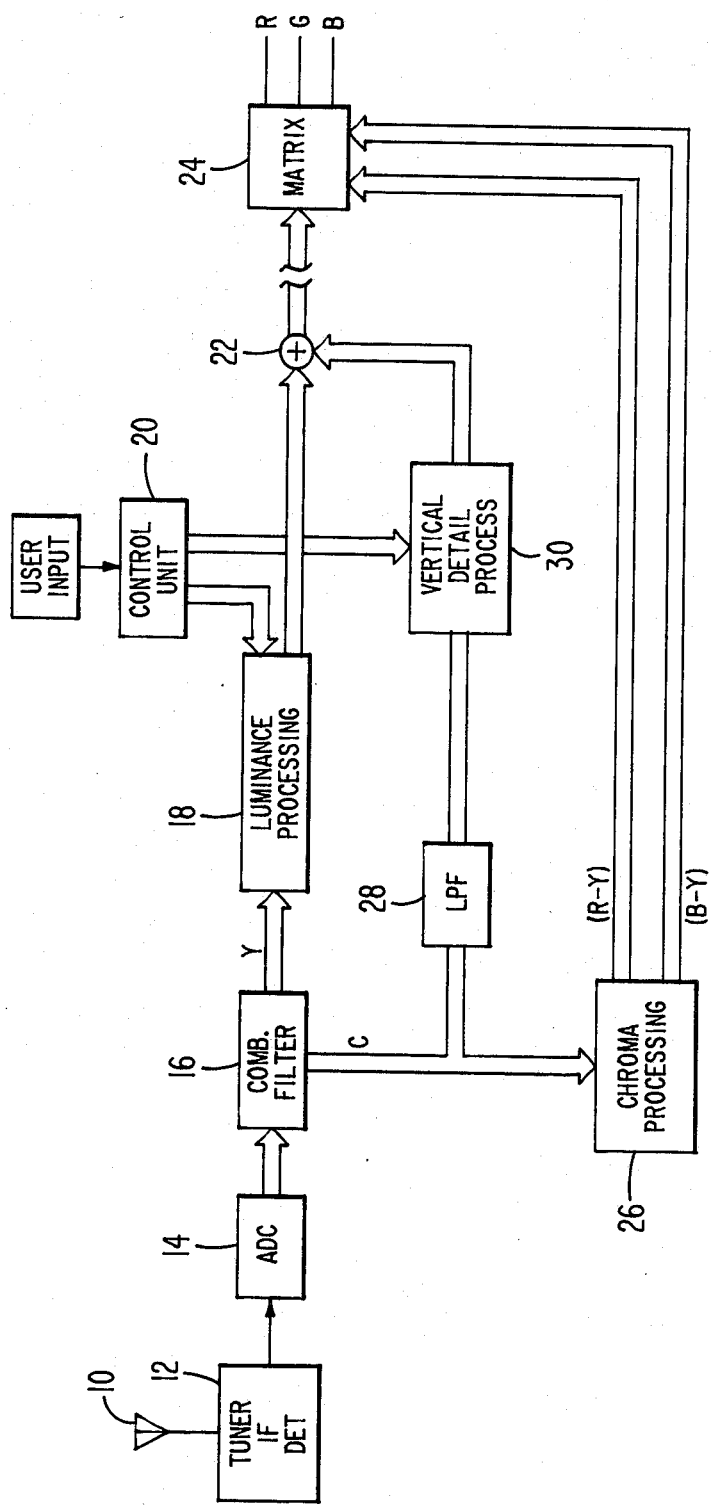
FIG. 1 is a block diagram of a digital TV receiver showing the basic circuit components related to vertical detail signal processing.

Referring to FIG. 1, a digital signal processing section of a television receiver is shown. In the Figure the broad arrows interconnecting elements represent parallel signal lines to accommodate, e.g. parallel bit binary signals. Narrow interconnecting arrows represent single signal lines to accommodate analog signals. It will be assumed herein that in general the samples are in two's complement format and the circuit elements are designed to process two's complement signals.

Broadcast RF video signal is received by antenna 10 and is applied to a conventional tuner-IF circuit 12. The tuner-IF circuit produces baseband composite video signal which is applied to an analog signal input terminal of the analog-to-digital converter (ADC) 14. ADC 14 generates binary representations of the analog signal at for example a four times color subcarrier sample rate. The digital signals from ADC 14 are applied to the input port of a digital comb filter 16 which separates the digital composite video signal into separate luminance (Y) and chrominance (C) components. The luminance signal is applied to the luminance processing element 18 which may include peaking and coring circuitry, contrast control circuitry etc. Processed samples from element 18 are applied to a summing circuit 22. In circuit 22 the processed luminance signal is combined with vertical detail signal which was recovered from the comb filtered chrominance signal. Signal from summing circuit 22 is applied to a matrix circuit 24 wherein it is combined with processed chrominance signal to generate R, G and B signals for driving an image display device.

Chrominance signal from comb filter 16 is applied to the chrominance processing element 26. Element 26 may include, a bandpass filter centered about the color subcarrier, tint control circuits, auto flesh circuits, saturation control, demodulator circuitry, etc. Element 26 produces the processed color different signal components (R−Y), (B−Y) or I,Q, from the chrominance signal and applies them to the matrix circuit 24.

Comb filtered signal from element 16 is also applied to the low pass filter 28 which substantially attenuates the chrominance component and passes the luminance vertical detail which occurs in comb filter chrominance signals. For a detailed explanation of why luminance vertical detail information is present in comb filtered chrominance signal see "A CCD Comb Filter for Color TV Receiver Picture Enhancement", D. H. Pritchard, RCA Review, Vol. 41, pp. 3-28, March 1980 incorporated herein by reference. The vertical detail information is peaked in circuit element 30 and applied to the summing circuit 22 wherein it is recombined with the main luminance signal.

Most circuit elements in a digital receiver are controlled by a central control unit for example a microprocessor. The control unit responds to user commands, signal quality etc., to produce and maintain the quality of the reproduced image substantially constant. The same circumstances may be presumed for the FIG. 1 apparatus. However, for convenience, in FIG. 1 the control unit 20 is shown coupled only to elements 18 and 30.

In general, it is more desirable to recombine vertical detail with the comb filtered luminance signal ahead of the luminance processing element so that both components of luminance signal undergo similar processing. In designing a digital receiver however, it may not be practical to partition circuit functions to accommodate recombining vertical detail ahead of the luminance processing element. In this instance the vertical detail processor 30 should be designed to respond to control input signals to enable it to track controlled changes of the luminance processing element 18. For instance, if a contrast multiplier in element 18 is directed to apply more gain to the luminance samples, then the vertical detail processor should be capable of simultaneously augmenting the gain applied to the vertical detail signals. Similarly, if noise reduction circuitry in circuit 18 is directed to narrow the signal bandwidth, the vertical detail circuit may simultaneously be directed to increase the noise coring threshold.

Figure 2:
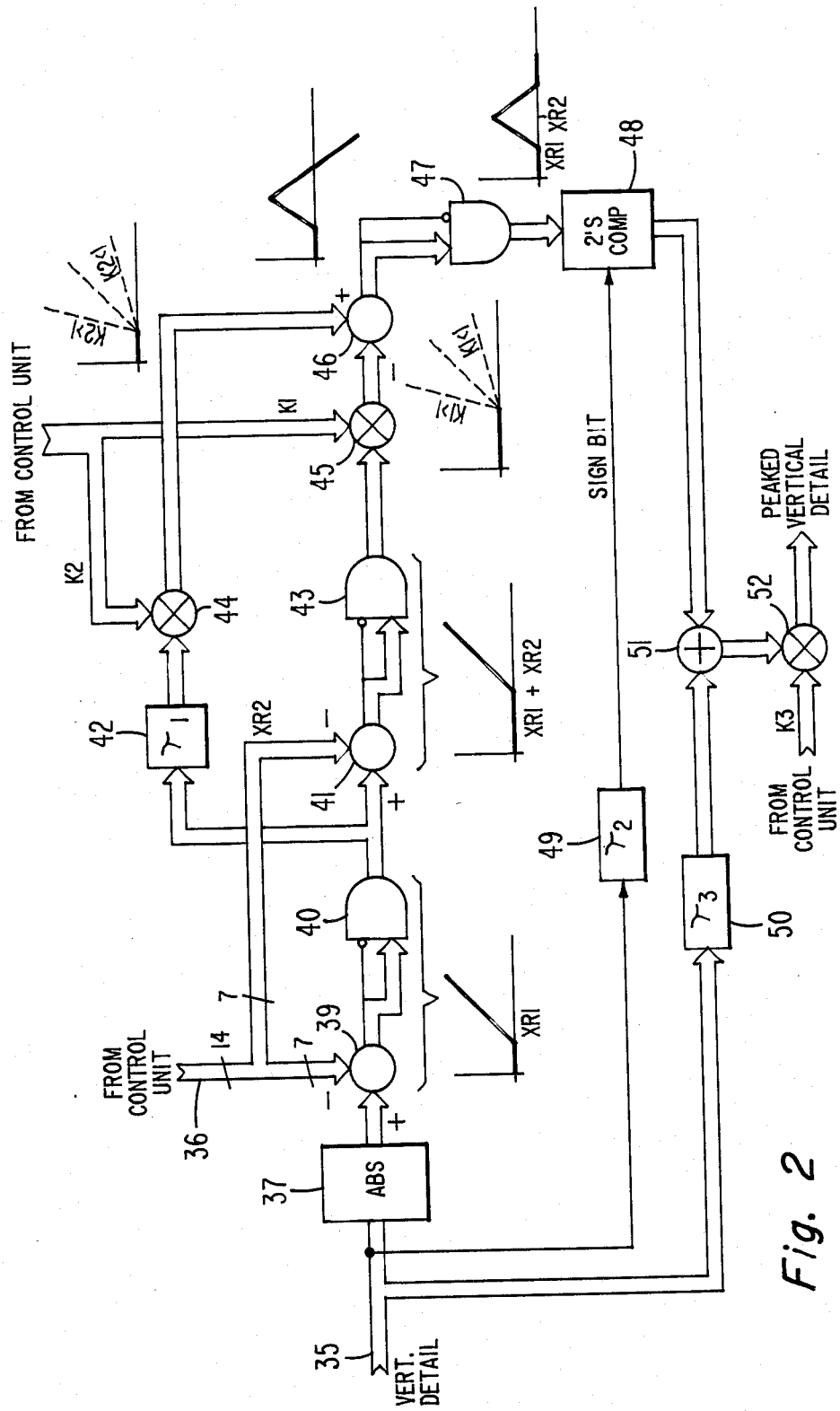
FIG. 2 is a logic schematic of vertical detail signal processing apparatus embodying the present invention.
Figure 3:
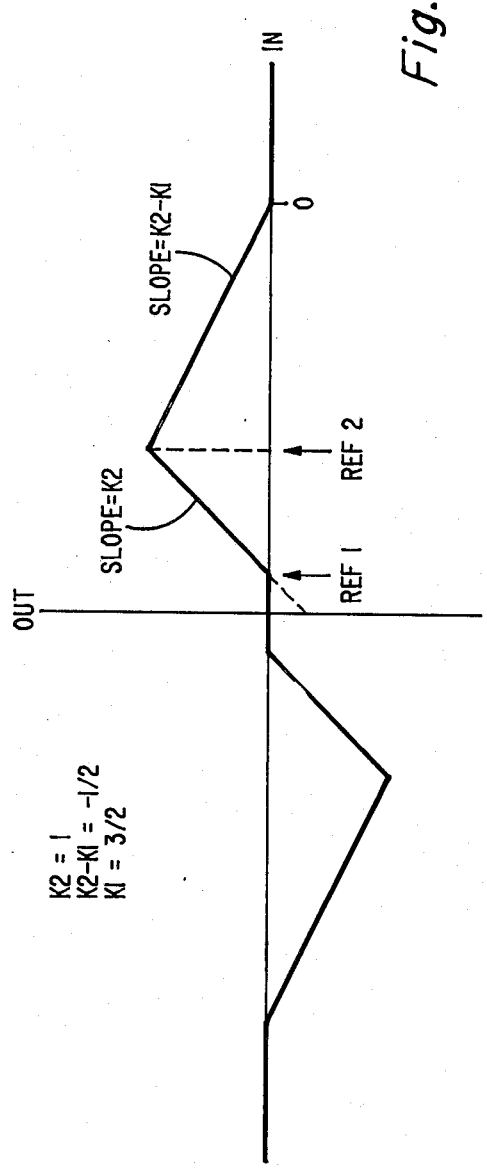
FIG. 3 is the transfer function of the peaking/paring portion of the vertical detail processing circuitry.

A function-variable or programmable vertical detail signal processing circuit is shown in FIG. 2. The FIG. 2 apparatus cores, peaks and pares the vertical signal and then adds it back to itself to form the signal which is recombined with the luminance signal. The coring-/peaking/paring function is illustrated in FIG. 3. In FIG. 3 the input signal is associated with the horizontal axis and the output signal with the vertical axis. For input signals from zero to Ref1, the output signal is held to zero, which is referred to as coring. For input values from Ref1 to Ref2, the input signal is scaled by the constant $K_2$. Adding the scaled input signal to unscaled input signal tends to produce a combined signal which is peaked or enhanced relative to the input signal over this range of input values. Beween the values Ref2 and point 0 the input signal is scaled by a negative factor. The magnitude of the negative factor is typically smaller than the magnitude of the former factor. Adding these latter scaled input values to unscaled input values tends to produce a combined signal which is pared or reduced relative to the input signal over the range of input values greater than the value Ref2. The combined signal is limited to preclude it from crossing the zreo axis. The functional symmetry is provided by processing only the magnitudes of applied signals and then changing the polarity of the processed samples corresponding to negative applied input samples.

Referring to FIG. 2, vertical detail signal is applied on bus 35 and routed to the input port of absolute value circuit 37 and delay element 50. From delay element 50 the vertical detail signal is coupled to combining circuit 51 wherein it is combined with processed vertical detail signal from element 48 to produce a peaked/pared vertical detail signal. This signal is applied to multiplier or scaling circuit 52 which scales the signal by a gain factor K3 provided by, e.g. the control unit. Delay element 50 is interposed between the input bus 35 and combining element 51 to compensate for the delay in the parallel vertical detail signal processing path between bus 35 and circuit element 48.

Absolute value circuit 37 converts the applied vertical detail signals to magnitude values only. The magnitude values, $X_n$, are applied to a subtractor 39. A first reference value $X_{R1}$ (corresponding to Ref1 in FIG. 3) from the control unit is applied to the subtrahend input of subtractor 39 which outputs the signal difference values $(X_n-X_{R1})$. Note element 39 may be an adder circuit and the applied reference value $X_{R1}$ from the control unit may be provided with negative polarity.

Difference values from element 39 are applied to AND gate 40 which is connected to function as a polarity discriminator. The sign bit of the difference value $(X_n-X_{R1})$ is applied to an inverting-input terminal of the AND gate 40 and the value bits of the difference values are applied to non-inverting input terminals. With this arrangement AND gate 40 passes only the magnitudes of positive differences. (AND gate 40 may be realized with N parallel 2-input AND gates each having an inverting input coupled to the sign bit line an each having a respective second input connected to respective ones of the magnitude bit lines.) The output signal from AND gate 40 has nonzero values only for those signal magnitude values that are greater than the reference value $X_{R1}$. As such, the combination of elements 39 and 40 performs a coring function, i.e. they eliminate low level signal variation of amplitude less than the value $X_{R1}$.

The magnitude values from AND gate 40 are coupled to the serial connection of combining circuit 41 and AND gate 43. Combining circuit 41 has a second reference value $X_{R2}$ (corresponding to Ref2−Ref1 in FIG. 3) coupled thereto from the control unit. The combination of elements 41 and 43 provides a function similar to elements 39 and 40. However, AND gate 43 provides nonzero values only for input magnitudes from element 37 which are greater than the value of $X_{R1}$ plus $X_{R2}$.

Output values from AND gate 43 are applied to a scaling circuit 45 which multiplies or scales the applied samples by a factor $K_1$. Scaling circuit 45 may have a fixed scale factor or it may be made programmable by application of scale factors from the control unit. In the latter case, circuit 45 will be a true multplier circuit or a programmable shift and add multiplier, etc. In the former instance, circuit 45 may be a hard wired shift and add scaling circuit. Alternatively if the scale factor is a fixed binary multiple or submultiple, element 45 may be a hard wired bit shift left or right to effect multiplication or division by factors of 2 respectively, for each bit position shifted.

Scaled magnitude values from scaling circuit 45 are applied to the first input port of signal combining circuit 46. Samples and AND gate 40, coupled via delay element 42 and scaling circuit 44 are applied to a second input port of combining circuit 46 wherein samples from scaling circuit 45 are subtracted from sample scaled by scaling circuit 44. Delay element 42 compensates for the difference in signal processing time introduced by the parallel processing paths between the output port of AND gate 40 and the input ports of combining circuit 46. Scaling circuit 44 is of similar construction to scaling circuit 45. In one particular embodiment the scale factors $K_1$ and $K_2$ are respectively 3/2 and 1 and the reference values $X_{R1}$ and $X_{R2}$ are decimal 4 and decimal 28 respectively.

Consider the signal produced at the output port of combining circuit 46. For magnitude values produced by element 37 which are less than $X_{R1}$ the output is zero. When the magnitude values are greater than $X_{R1}$ but less than $X_{R2}$ plus $X_{R1}$ AND gate 43 provides all zero values and scaling circuit 44 contributes all of the output signal. For magnitudes greater than $X_{R1}+X_{R2}$ both scaling circuits 44 and 45 provide contributions to the output, one being positive and the other negative. Thus the output response is zero until the magnitudes exceed $X_{R1}$ exhibit a gain of $K_2$ for magnitudes greater than $X_{R1}$ but less than $X_{R2}$ plus $X_{R1}$ and then exhibit a gain of $K_2-K_1$ (with an offset) for magnitudes greater than $X_{R2}+X_{R1}$.

Signal from combining circuit 46 is applied to gate 47, the output of which provides only positive values. Output samples from AND gate 47 are then applied to the two's complementing circuit 48 which complements those processed magnitudes which correspond to negative vertical detail signals applied at bus 35. Two's complementing circuit 48 is responsive to the sign bit corresponding to the particular sample which has been appropriately delayed in time by delay element 49.

The combination of the absolute value circuit at the input end and the two's complementing circuit at the output end of the non-linear part of the circuit provides symmetrical signal processing. Note that if element 40 is coupled directly to te input of two's complement circuit 48 the output signal is symmetrically cored. Coupling element 40 to element 48 with scaling circuit 44 produces a cored signal multiplied by the gain factor K2. Adding paralleled combinations of differencing circuits and polarity discriminators (such as element 41 and 43) between element 40 and two's complement circuit 48 adds the dimension of piecewise linear processing. Finally, adding the processed signal back into non-processed signal produces peaked and pared signal.

What is claimed is:

1. Apparatus for processing a digital video signal, comprising:

means for applying a digital signal capable of exhibiting positive and negative values;

means responsive to said digital signals for producing a signal corresponding to the absolute value of said digital signal;

a source of reference value, $X_{R1}$;

means responsive to the absolute value of said digital signal and said reference value $X_{R1}$ for producing a signal corresponding to the difference values therebetween;

a polarity discriminator responsive to said difference values for passing difference values of one polarity only;

a polarity inverting circuit having an input port and an output port and being responsive to the polarity of digital signal samples occurring at the means for applying digital signal, for selectively inverting the polarity of signal samples applied to its input; and means for coupling said polarity discriminator to the input port of said polarity inverting circuit, wherein the output signal from the polarity inverting circuit is a symmetrically processed signal functionally dependent upon the reference value $X_{R1}$.

2. The apparatus set forth in claim 1 wherein the means for coupling said polarity discriminator to the input port of said polarity inverter circuit includes:

a scaling circuit for scaling signal applied thereto by a scale factor and having input and output ports coupled respectively to the polarity discriminator and the polarity inverting circuit.

3. The apparatus set forth in claim 2 wherein the means for coupling said polarity discriminator to the input port of said polarity inverting circuit further includes:
  a source of reference values $X_{R2}$;
  signal combining means having first and second input ports coupled respectively to said polarity discriminator and said source of reference value X R2, for providing at an output port thereof the difference values of samples applied to said first and second input ports;
  a second polarity discriminator coupled to the output port of said signal combining means, for passing difference values of one polarity only;
  a second signal combining means having first and second input ports and having an output port;
  respective means for coupling the first and second input ports of said second signal combining means to the output port of said scaling circuit and to said second polarity discriminator respectively; and
  means for coupling the output port of said second signal combining means to the input port of said polarity inverting circuit; wherein the output signal produced by said polarity inverting circuit is a piecewise linear symmetrically processed signal.

4. The apparatus set forth in claim 3 wherein the means for coupling the second polarity discriminator to the second signal combining means includes a further scaling circuit for scaling applied signal by a constant.

5. The apparatus set forth in claim 3 wherein the means for coupling the second signal combining means to the polarity inverting circuit includes a third polarity discriminator circuit.

6. The apparatus set forth in claim 3 further including a third signal combining circuit having first and second input ports respectively coupled to the means for applying a digital signal and the output port of said polarity inverting circuit, for producing a combined signal which is symmetrically peaked at least over a range of digital signal input values.

7. The apparatus set forth in claim 3 wherein said second signal combining means subtractively combines signal applied to its first and second input ports.

8. The apparatus set forth in claim 3 wherein the means for coupling the first input port of the second signal combining means to the scaling circuit includes a delay element for equilibrating signal delay of samples occurring at the first and second input ports of said second signal combining circuit.

9. Apparatus for processing a digital video signal comprising:
  means for applying a digital video signal;
  means for applying first and second reference values;
  means responsive to said digital video signal for producing a signal corresponding to the absolute values of the magnitude thereof;
  first and second threshold/polarity discriminator means having respective reference signal input ports, respective signal input ports and respective output ports, said means each providing output signals of one polarity only and only for applied input signals that exceed respective applied reference signal values;
  respective means for coupling the signal input port and the reference signal input port of the first threshold/polarity discriminator means to the absolute value means and the means for applying said first reference value respectively;
  respective means for coupling the signal input port and the reference signal input port of the second threshold/polarity discriminator means to the output port of the first threshold/polarity discriminator and the means for applying said second reference value respectively;
  signal scaling means having signal input and output ports, said signal scaling means having its input port coupled to the output port of the second threshold/polarity discriminator means;
  signal combining means (46) having first and second input ports coupled respectively to the output port of said signal scaling means and the output port of the first threshold/polarity discriminator means, and having an output terminal at which processed digital signal is available.

10. The apparatus set forth in claim 9 wherein said first and second threshold/polarity discriminator each comprise:
  a signal combining means (39, 41) having first and second input ports respectively coupled to the reference signal input port and the signal input port of the respective threshold/polarity discriminator and having an output port, said signal combining means providing difference signals at its output port; and
  gating circuitry responsive to the polarity of said difference signals for passing difference signals of one polarity only.

11. The apparatus set forth in claim 9 further including:
  a two's complementing circuit having an input port coupled to the output terminal of said signal combining means (46) and responsive to the polarity of digital video signal samples provided by said means for applying a digital video signal corresponding to the processed digital video signal samples applied to said two's complementing circuit.

12. The apparatus set forth in claim 11 further including:
  signal combining means (51) having first and second input ports respectively coupled to said two's complementing circuit and to said means for applying a digital video signal, and having an output port at which peaked digital video signal is available.

13. The apparatus set forth in claim 9 further including:
  second signal combining means (51) having first and second input ports respectively coupled to the output terminal of said signal combining means and to said means for applying a digital video signal, and having an output port at which peaked digital video signal is produced.

14. The apparatus set forth in claim 13 wherein said second signal combining means (51) is coupled to the output terminal of said signal combining means (46) by means including a two's complementing circuit responsive to the polarity of signals occurring at said means for applying a digital video signal.

15. The apparatus set forth in claim 9 wherein said signal combining means (46) is coupled to the first threshhold/polarity discriminator means by a second signal scaling circuit.

16. The apparatus set forth in claim 10 wherein said signal combining means (46) is coupled to the first threshold/polarity discriminator means by a second signal scaling circuit.

17. The apparatus set forth in claim 12 wherein said signal combining means (46) is coupled to the first threshold/polarity discriminator means by a second signal scaling circuit.

18. Apparatus for processing a digital video signal which exhibits positive and negative values, comprising:
   an input bus for applying said digital video signal;
   a source of a reference value, $X_{R1}$;
   means coupled to said input bus and said source for passing a single polarity signal corresponding to differences between the magnitude of said digital video signal and said reference value;
   a polarity inverting circuit having an input port and an output port and responsive to the polarity of digital video signal samples occurring at said input bus, for selectively inverting the polarity of signal samples applied to its input port; and
   means for coupling the input port of the polarity inverting circuit to said means for passing a single polarity signal, wherein output signal from the polarity inverting circuit is symmetrically processed relative to signal polarity, and is functionally dependent upon the reference value $X_{R1}$.

* * * * *